Nov. 9, 1943.   C. H. CORWIN   2,333,641
LUMINOUS ADHESIVE SHEET
Filed March 28, 1940
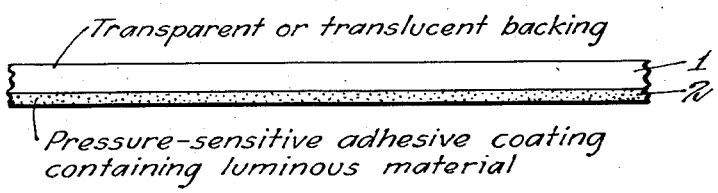
Inventor
Carlton Henry Corwin
By Carpenter, Abbott, Coulter & Kinney
Attorneys Patented Nov. 9, 1943

2,333,641

UNITED STATES PATENT OFFICE 2,333,641

LUMINOUS ADHESIVE SHEET

Carlton Henry Corwin, Knowle, England, assignor to Minnesota Mining & Manufacturing Company, St. Paul, Minn., a corporation of Delaware Application March 28, 1940, Serial No. 326,500 In Great Britain March 30, 1939

3 Claims. (Cl. 250—80)

This invention relates to an improved adhesive sheet or tape material which is visible in the dark, or is capable of being rendered visible in the dark, for instance, by rays invisible to the human eye, such as ultra-violet rays, and is suitable for application to objects for identification, directional, display or similar purposes at night time or in locations in which little or no light is available or permissible.

A further object of the present invention is to provide an adhesive material or composition which is visible in the dark, or is capable of being rendered visible in the dark, for instance, by rays invisible to the human eye such as ultra-violet rays.

With the above objects in view the present invention in one aspect consists in adhesive sheet or tape material comprising a backing material having an adhesive material or composition and a luminous material or composition applied thereto.

In another aspect the present invention consists in an adhesive material or composition having a luminous material or composition admixed therewith.

The expression "luminous material or composition" as used in this specification is intended to include any material or composition which has phosphorescent, fluorescent, and/or autoluminescent properties.

The accompanying drawing shows an illustrative embodiment of a luminous adhesive sheet or tape having a transparent or translucent backing 1, which may, for example, be a sheet of regenerated cellulose film ("Cellophane"), having on one face a permanently tacky, pressure-sensitive, adhesive coating 2 containing a luminous material, the latter being visible through and protected by the overlying backing.

The adhesive material or composition is preferably of the non-drying or pressure sensitive type and may comprise uncured rubber or rubber latex, or a rubber-rosin composition.

Any suitable backing material, such as paper, cloth, regenerated cellulose or the like may be used, and the backing material may be opaque, transparent or translucent. A transparent or translucent regenerated cellulosic backing material, such as that known by the registered trademark "Cellophane," has been found particularly suitable when the adhesive material or composition and the luminous material or composition are admixed and applied to one face only of the backing material. In that case the luminous material or composition is visible from both sides of the backing material although only one surface thereof is coated.

In some cases, for example, when an opaque backing material is employed, the adhesive material or composition may be applied to one face of the backing material and the luminous material or composition to the other face thereof, that is to say to the face opposite to that carrying the adhesive material or composition. In such cases the luminous material or composition may be applied to the backing material by first forming a paste or solution by mixing the luminous material or composition in powdered form with a vehicle, such as a lacquer, which has no unfavorable reaction with the luminous material or composition and which, upon drying, is capable of being formed into a firm flexible film, then applying a thin coating of the paste or solution to the backing material and subsequently subjecting it to suitable drying conditions either with or without heat. If desired, two or more coatings of the paste or solution may be applied to the backing material.

The particular powdered luminous material or composition used for coating a backing material on the reverse side to that on which the adhesive material or composition is coated depends upon whether a phosphorescent, fluorescent, or autoluminescent property is desired in the resultant sheet or tape material and any suitable known luminous material or composition in powdered form may be used. The luminous materials or compositions giving the best results at present known to us, however, are the following viz:

(a) For phosphorescent properties—strontium sulphide.

(b) For fluorescent properties—strontium sulphide, cadmium sulphide and zinc sulphide, the last two giving better fluorescent properties than the first.

(c) For autoluminescent properties—zinc sulphide admixed with a very small quantity of radium bromide or mesothorium bromide. In a normal mixture about 20 milligrammes of radium bromide or mesothorium bromide are admixed with 100 grammes of zinc sulphide.

Certain materials, such as casein, have fluorescent properties only and may be used where this property only is desired: All the materials mentioned above, however, have both phosphorescent and fluorescent properties.

As examples of suitable vehicles for powders of the luminous materials or compositions mentioned above, polystyrene lacquer, polymerized vinyl acetate lacquer, damar and latex may be mentioned. Methacrylate may also be used as a vehicle.

The application of the coating of the luminous material or composition to the backing material may be effected in any known manner, and either simultaneously with the application of the adhesive material or composition to the backing material, or as a separate operation after the adhesive material or composition has been applied to the backing material.

The following are examples of mixes which may be used when the adhesive material or composition and the luminous material or composition are admixed. Such mixes may advantageously be applied to one face only of a transparent or translucent backing material as hereinbefore mentioned, the mix being preferably applied in a single coating operation like that normally employed in the manufacture of adhesive sheet or tape material for applying the adhesive material composition.

Example 1

| | Pounds |
|---|---|
| Milled rubber base consisting of 50% latex crepe rubber and 50% zinc oxide | 7.1 |
| Latex crepe rubber | 1.6 |
| Water white wood rosin | 4.0 |
| Ester gum | .8 |
| Preservative | .05 |
| Anti-oxidant | .05 |
| Heptane (solvent) | 28.4 |
| Luminous material or composition | 5.0 |

Example 2

| | |
|---|---|
| Latex crepe rubber | 3.6 |
| Zinc oxide | 1.0 |
| Water white wood rosin | 1.7 |
| Ester gum | 3.0 |
| Preservative | .05 |
| Anti-oxidant | .05 |
| Heptane (solvent) | 24.5 |
| Mineral oil (liquid paraffin) | .8 |
| Luminous material or composition | 5.0 |

Any suitable luminous material or composition, such as hereinbefore mentioned, may be used depending upon the properties desired in the resultant adhesive sheet or tape material. A suitable preservative is beta naphthol, but any other preservative may be employed. Examples of anti-oxidants are diphenylamine, aldol-naphthylamine and phenyl-naphthylamine.

The mix of Example 1 is made up as follows: First the solvent is placed in a mixer and then are added the preservative and anti-oxidant, the rubber and rubber base, the rosin and ester gum and the luminous material or composition, itself dispersed in solvent, in the order named. Mixing is continued until a smooth consistency is obtained.

The mix of Example 2 is made up as follows: First the latex crepe rubber is milled with the zinc oxide. This milled mixture is added to the solvent in a mixer after the original addition of preservative and anti-oxidant. Then the rosin, ester gum, and luminous material or composition, the latter dispersed in solvent, and the liquid paraffin are added in the order named. Mixing is continued until a smooth consistency is obtained.

In applying the foregoing adhesive mixes to a backing material, the backing material preferably is first given a preliminary or priming coat, for example of a rubber-rosin composition, on one side in order securely to anchor the mix to the backing material. The mix is then applied to the same side and thoroughly dried. In this manner a luminous adhesive sheet or tape is made which can be stacked in layers or rolled up and unrolled without any tendency for the adhesive mix to transfer itself from one layer to another or from one side of the backing material to the other side while in the rolled condition. Moreover, the adhesive mix in the dry state is permanently tacky and will adhere satisfactorily to most surfaces. On the other hand the backing material coated with this adhesive mix may be removed from any surface to which it is united, leaving the surface clean and free from any residual deposit of adhesive mix.

The presence of zinc oxide in the mix provides a clear white background which enhances the luminous effect of the finished product which can readily be seen in the dark, provided it has previously been charged or activated by exposure to light in the case when a phosphorescent luminous material or composition is used, or is suitably activated when a fluorescent luminous material or composition is used.

For examples of adhesive sheet or tape materials and adhesive materials or compositions which may be used in carrying the invention into effect reference may be had to United Kingdom patent specifications, Nos. 312,610, 405,247, 405,263, 405,270, 425,159, 425,343, 427,700, 427,701, 427,702, 431,560, 482,575, 482,815.

What I claim is:

1. A luminous adhesive sheet or tape comprising a transparent or translucent flexible sheet backing having an exposed non-drying pressure-sensitive adhesive coating on one face, said adhesive coating including a white reflective pigment and a luminous material visible through the backing.

2. A luminous adhesive sheet or tape comprising a transparent or translucent flexible sheet backing having an exposed non-drying pressure-sensitive adhesive coating on one face, said adhesive being compounded of rubber, tack-producing resin, a white reflecting pigment and a luminous material visible through the backing.

3. A luminous adhesive sheet or tape comprising a transparent or translucent flexible sheet backing coated on one face with a luminous material visible through the backing and a permanently tacky adhesive providing an exposed pressure-sensitive adhesive surface whereby the sheet or tape may be removably affixed to surfaces by mere application of pressure with the luminous material protected by the overlying backing, said adhesive including a reflective pigment to intensify the luminosity visible through the backing.

CARLTON HENRY CORWIN.